United States Patent [19]
Witkin et al.

[11] 4,011,430
[45] Mar. 8, 1977

[54] MULTIZONE ELECTRICAL FURNACE METHODS AND APPARATUS

[75] Inventors: Donald Eli Witkin; Andrew Stephenson Dalgleish Crum, both of Warren, Pa.

[73] Assignee: National Forge Company, Irvine, Pa.

[22] Filed: May 6, 1975

[21] Appl. No.: 574,961

[52] U.S. Cl. .................................. 219/486; 13/24; 219/483
[51] Int. Cl.² .......................................... H05B 1/02
[58] Field of Search .......... 219/483, 485, 486, 487, 219/494, 497, 499, 501; 13/20, 24

[56] References Cited
UNITED STATES PATENTS

| | | | |
|---|---|---|---|
| 2,282,226 | 5/1942 | Hoop | 13/24 |
| 2,719,799 | 10/1955 | Christian | 13/24 X |
| 2,952,722 | 9/1960 | Jackson | 13/20 |
| 3,560,712 | 2/1971 | Touhill | 219/497 |
| 3,736,360 | 5/1973 | Bergman et al. | 13/24 |
| 3,855,452 | 12/1974 | Flasza | 219/486 |

FOREIGN PATENTS OR APPLICATIONS 1,025,540  3/1958  Germany .......................... 219/483

*Primary Examiner*—J D Miller
*Assistant Examiner*—Fred E. Bell
*Attorney, Agent, or Firm*—Robert R. Jackson; Charles B. Smith

[57] ABSTRACT

In a multizone electrical furnace the phase shift effect of the thyristor devices used to control the power supplied to each thermal zone is reduced by providing two or more heater circuits, each including a thyristor device and a heating element, for each thermal zone. The thyristor devices are controlled so that only one thyristor device associated with each thermal zone is operating to produce a substantial phase shift at any time. Over-powering the heating elements at higher furnace temperatures may also be prevented by connected two or more heating elements associated with a thermal zone to one of the thyristor devices associated with that zone above a predetermined threshold temperature.

8 Claims, 6 Drawing Figures

MULTIZONE ELECTRICAL FURNACE METHODS AND APPARATUS

BACKGROUND OF THE INVENTION

This invention relates to multizone electrical furnace systems, and more particularly to methods and apparatus for controlling such systems.

Many electrical furnaces have a plurality of thermal zones which are separately controlled, for example, to provide uniform temperatures throughout the furnace under various operating conditions. One example of furnaces of this type are high pressure, high temperature furnaces used as hot isostatic presses. Because of the large power requirements of such furnaces, polyphase (usually three phase) power is typically supplied to the furnace. The heating element or elements for each thermal zone are connected in circuit relation with a respective one of the phases of the power supply, i.e., the heating elements for each thermal zone are connected either between a pair of power supply lines (so-called phase to phase or delta connection) or between a power supply line and ground (so-called phase to ground or Y connection). If there are more thermal zones than power supply phases, the heating elements for two or more thermal zones are connected in circuit relation with each phase of the power supply. The amount of power supplied to the heating elements for each thermal zone is controlled by a thyristor device (e.g., a semi-conductor controlled rectifier or Triac) connected in series with the heating elements for that thermal zone. The thyristor devices control the amount of power supplied to the associated heating elements by clipping or suppressing a portion (typically the initial portion) of each oscillation of the power supply signal. The effect of such clipping is to shift the phase of the power applied to the heating elements relative to the phase of the power supply signal.

It is frequently necessary to supply substantially different amounts of power to the several thermal zones of the furnace. In a vertically disposed hot isostatic press having vertically adjacent thermal zones, for example, temperature uniformity is achieved at low pressures by supplying approximately the same amount of power to each thermal zone. At higher pressures, however, convection becomes an increasingly important heat transfer mechanism, and substantially more power must be supplied to the lower thermal zones than to the upper thermal zones to maintain temperature uniformity. When substantially different amounts of power are supplied to the various thermal zones, substantially different phase shifts are produced in the power supplied from the various power supply phases by the action of the thyristor devices. These different phase shifts can cause excessive currents in the power supply lines. These currents can be significantly greater than would be expected without considering the phase shift effect of the thyristor devices. The result of these excessive line currents can be overheating of and damage to the external circuits (e.g., the power supply lines).

Another problem encountered in the operation of electrical furnaces is that the heating elements in the furnace dissipate much more power at low furnace temperatures than they do at high furnace temperatures. Particularly when the power supply is designed to provide rapid warm-up of the furnace, the heating elements may be substantially over-powered when the furnace is at higher temperatures. This problem can be especially serious in furnaces with molybdenum heating elements which are capable of absorbing more power at higher temperatures because of the substantially increased resistance of molybdenum at those temperatures. If the heating elements are substantially over-powered (i.e., the heating elements are absorbing more power than they can dissipate), the heating elements may overheat and burn out.

In view of the foregoing, it is an object of this invention to provide improved electrical furnace systems.

It is a more particular object of this invention to provide electrical furnace systems in which the effects of the phase shifts produced by the thyristor control devices are substantially reduced.

It is another more particular object of this invention to provide electrical furnace systems in which the match between the power supplied to the furnace heating elements and the power dissipating properties of those elements at various temperatures is improved and over-powering of the heating elements at higher temperatures is substantially prevented.

SUMMARY OF THE INVENTION

These and other objects of the invention are accomplished in accordance with the principles of the invention by providing a multizone furnace in which two or more heater circuits, each including a thyristor device and a heating element, are associated with each thermal zone. The heater circuits for each thermal zone are connected in parallel in circuit relation with a respective one of the phases of the power supply, i.e., the heater circuits for each thermal zone are connected either between a pair of power supply lines (delta connection) or between a power supply line and ground (Y connection). If there are more thermal zones than power supply phases, the heater circuits for two or more thermal zones are connected in circuit relation with each phase of the power supply. The thyristor devices are controlled so that in general only one thyristor device associated with each thermal zone is operating to produce a substantial phase shift at any time. The other thyristor devices associated with each thermal zone are either nonconducting or fully conducting and therefore produce no substantial phase shift. Accordingly, the phase shift effects in furnaces constructed in accordance with the principles of this invention are substantially reduced as compared to furnaces constructed without the benefit of this invention.

Over-powering of the heating elements at higher temperatures can also be prevented in accordance with the principles of this invention by providing means for selectively interconnecting the heater circuits associated with each thermal zone so that at temperatures above a predetermined threshold temperature two or more heating elements in each thermal zone are connected to one of the thyristor devices associated with that zone. The power supplied by the thyristor devices thus connected to two or more heating elements is divided between those elements and the elements cannot be over-powered.

Further features of the invention, its nature and various advantages will be more apparent from the accompanying drawing and the following detailed description of the invention.

DETAILED DESCRIPTION OF THE INVENTION

Figure 1:
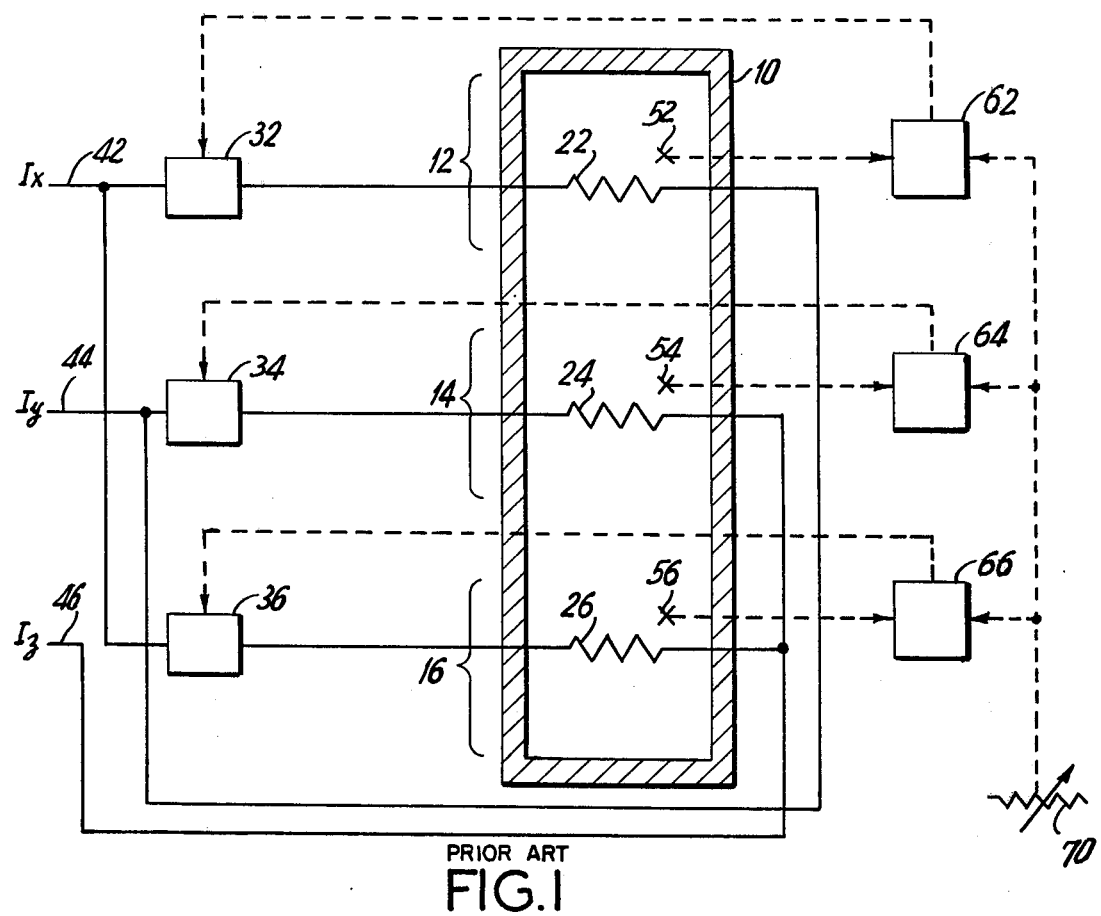
FIG. 1 is a schematic block diagram of a conventional multizone electrical furnace system.

In the conventional system shown in FIG. 1, furnace 10, represented schematically as though cut away to reveal its interior, includes three thermal zones 12, 14, and 16. These three thermal zones are all in communication with one another, but under various operating conditions it may be necessary to supply substantially different amounts of power to them as mentioned above. The amount of power supplied to each of thermal zones 12, 14, and 16 is respectively controlled by thyristor devices 32, 34, and 36. The power supplied to each thermal zone is converted to heat by a resistive heating element (respectively 22, 24, and 26) connected in series with the thyristor device for that thermal zone and disposed in or adjacent to that thermal zone. For convenience herein, a thyristor device and heating element connected in series are referred to as a heater circuit.

Three phase alternating current electrical power is supplied to the system by way of power supply lines 42, 44, and 46. Each of leads 42, 44, and 46 carries current characterized by a different one of said phases, respectively designated Ix, Iy, and Iz. In the system shown in FIG. 1, the three heater circuits are in so-called delta connection with the power supply lines. Each heater circuit is connected between a respective one of the possible pairs of the power supply lines. Thus the heater circuit including elements 22 and 32 is connected between power supply lines 42 and 44; the heater circuit including elements 24 and 34 is connected power supply lines 44 and 46; and the heater circuit including elements 26 and 36 is connected between power supply lines 42 and 46. Accordingly, when all three thermal zones are at the same temperature and the same amount of power is being supplied to all three thermal zones, the three phases of the power supply are substantially balanced.

The heater circuits in a system of the type shown in FIG. 1 can alternatively be in so-called Y connection with the power supply lines. In that case, each of the three heater circuits is connected between a respective one of the three power supply lines and a common ground. In other respects the system would be similar to that shown in FIG. 1. Since the principles of this invention are equally applicable to delta connection and Y connection of the heater circuits, it will be understood that the phrase "connected in circuit relation with a phase of the power supply" or the like used herein and in the appended claims means either connection between a pair of power supply lines as in a delta connection, or connection between a power supply line and ground as in a Y connection.

Returning to the system of FIG. 1, each of thermal zones 12, 14, and 16 has a thermocouple, respectively designated 52, 54, ad 56, disposed therein for producing an electrical output signal proportional to the temperature in the associated thermal zone. (As used herein, the term proportional is used in the broad sense and does not necessarily mean linearly proportional.) The output signals of thermocouples 52, 54, 56 are respectively applied to one input terminal of controller circuits 62, 64, 66. The system also includes a temperature selector device 70 which produces an output signal proportional to a desired temperature setting of the furnace. The output signal of temperature selector 70 is applied to a second input terminal of each of controller circuits 62, 64, 66. Temperature selector 70 can be a manually operated device or it can be automatically controlled, for example, by a process control computer. Although only one temperature selector is employed in the system of FIG. 1, separate temperature selectors can be provided for each thermal zone if desired.

Each of controller circuits 62, 64, and 66 compares the signal applied to it from the associated thermocouple with the signal applied to it from temperature selector 70 and produces an output signal respectively applied to thyristor devices 32, 34, 36 for controlling the amount of power supplied to the associated thermal zone. For example, if the temperature called for by temperature selector 70 is greater than the temperature indicated by thermocouple 52, controller circuit 62 produces an output signal applied to thyristor device 32 for increasing the power supplied to heating element 22. This increases the amount of heat supplied to thermal zone 12, thereby tending to raise the temperature in that zone as required. If the temperature called for by temperature selector 70 is less than the temperature indicated by thermocouple 52, controller circuit 62 produces an output signal for decreasing the amount of power supplied to heating element 22 by thyristor device 32. If the temperature called for by temperature selector 70 is the same as the temperature indicated by thermocouple 52, thermal zone 12 is in equilibrium and no change is made in the amount of power supplied to heating element 22 by thyristor device 32. Controller circuits 64 and 66 are similar and operate in the same manner to control thyristor devices 34 and 36 and therefore the amount of power supplied to heating elements 24 and 26.

Figure 2A:
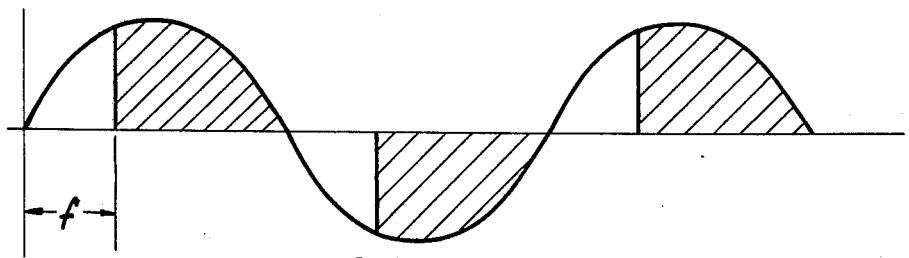
FIGS. 2a and 2b are electrical signal traces useful in explaining the operation of system of FIG. 1.

As is characteristic of thyristor devices generally, thyristor devices 32, 34, and 36 control the amount of power supplied to the associated heating elements by suppressing a portion of each oscillation of the power supply signal as shown, for example, in FIG. 2a. In FIG. 2a, the sinusoidal curve represents the voltage of one phase of the power supply signal, i.e., the voltage of the signal on one of power supply lines 42, 44, and 46 in the system shown in FIG. 1. A thyristor device to which that signal is applied conducts only during the shaded portions of the voltage oscillations. The point at which the thyristor device begins to conduct (relative to the preceding zero-axis crossing) is called the firing angle $f$ of the thyristor. This firing angle can vary from 0° (thyristor conducting at all times) to 180° (thyrsitor non-conducting at all times). In the example shown in FIG. 2a, $f$ is approximately 60°. The power output of the thyristor device is inversely proportional to the firing angle (i.e., the power output is maximum for $f=0°$ and zero for $f=180°$). The firing angle is controlled by a trigger circuit (assumed to be part of the thyristor devices shown in FIG. 1) which is in turn controlled by the control signal applied to the thyristor device from the associated controller circuit. Typically, the control signal may vary from 0 to 5mA and the firing angle is proportional to that signal. When more heat is required in a particular thermal zone of the furnace, e.g., thermal zone 12, the output signal of controller circuit 62 increases, thereby decreasing the firing angle of thyristor device 32 and supplying more power to heating element 22. When less heat is required, the output signal of controller circuit 62 decreases, thereby increasing the firing angle of thyristor device 32 and reducing the power supplied to heating element 22.

Figure 2B:
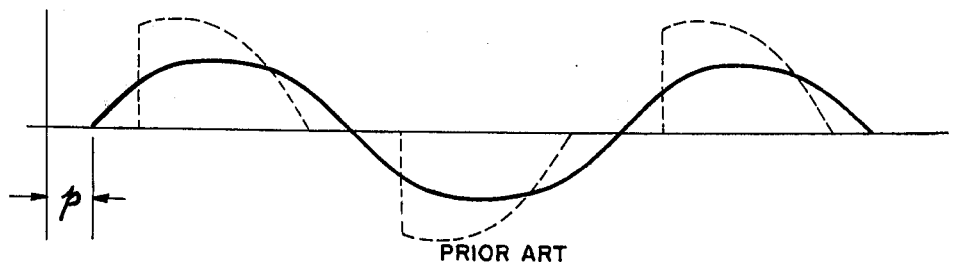

As illustrated by FIG. 2b, the effect of a thyristor operating with a firing angle between 0° and 180° is to shift the phase of the power applied to the load (i.e., the associated heating element) relative to the phase of the power supply, as well as to reduce the amount of power applied to the load. In FIG. 2b, the broken line is the outline of the shaded portion of the curve of FIG. 2a and the solid line is the fundamental harmonic of the broken curve as provided by a Fourier analysis of that curve. Most of the power in the signal passed by a thyristor operating as shown in FIG. 2a is represented by the fundamental harmonic signal shown in FIG. 2b. The phase of this fundamental harmonic is shifted $p$ degrees relative to the power supply signal. This phase shift is approximately zero when the thyristor firing angle is zero, and it increases as the firing angle increases. As the firing angle approached 180°, the phase shift approaches 90°. When the firing angle is 180°, the thyristor is completely shut off and the effect of the phase shift can be assumed to be negligible.

In general, the effect of the phase shifts described above, particularly when substantially different phase shifts are present in the heater circuits associated with different power supply phases, is to unbalance or further unbalance the currents in the power supply lines, possibly causing excessive currents in those lines with consequent overheating and damage to the external circuits. As mentioned above, even in furnaces in which it is desired to maintain uniform temperatures throughout, there are frequently periods of operation when the heat transfer mechanisms or other conditions in the furnace are such that substantial amounts of power must be applied to some heating elements, while substantially less power is required for other heating elements. This results in relatively small phase shifts in some heater circuits and relatively large phase shifts in other circuits. This may substantially unbalance the power supply, with possibly serious consequences as mentioned above.

Figure 3:
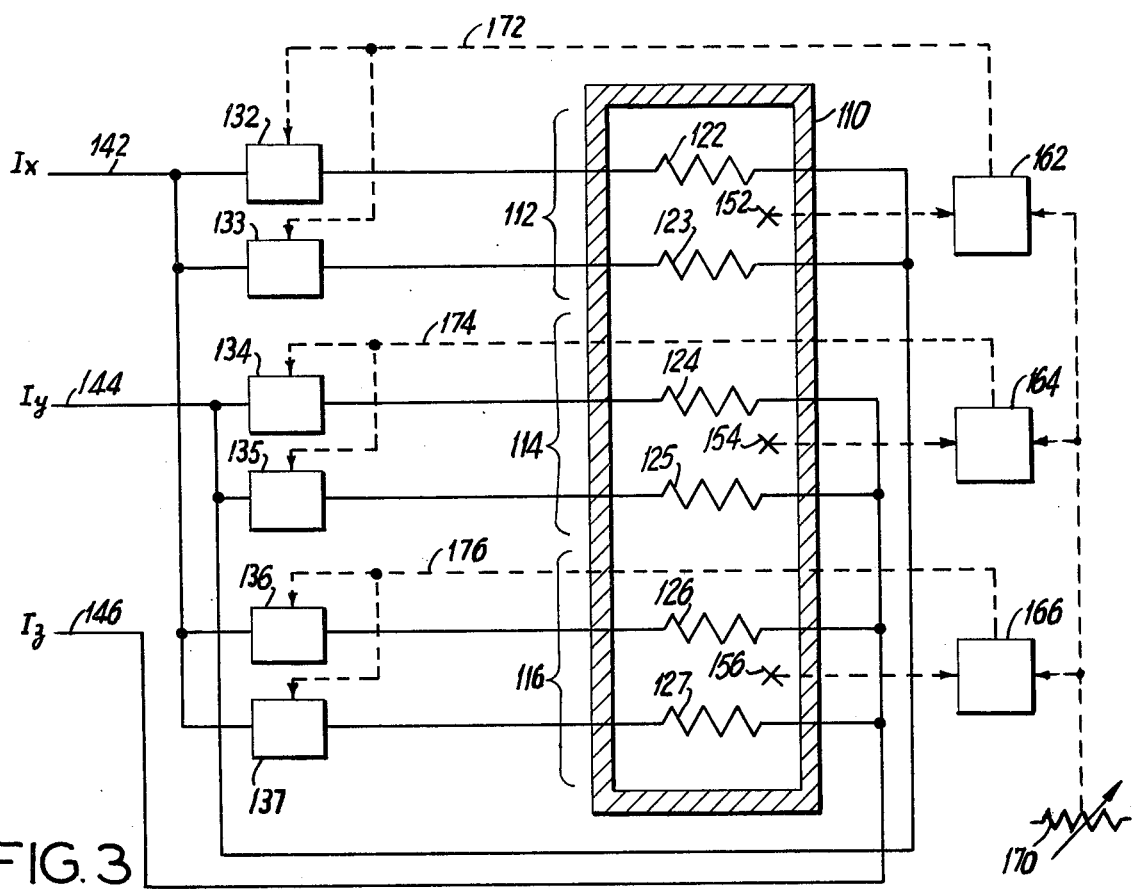
FIG. 3 is a schematic block diagram of a furnace system constructed in accordance with the principles of this invention and arranged in delta connection with a power supply.

FIG. 3 shows a furnace system constructed in accordance with the principles of this invention to reduce the phase shift effects described above. As shown in FIG. 3, furnace 110 includes three thermal zones 112, 114, 116. Two heater circuits are provided for each thermal zone. The heater circuits for thermal zone 112 respectively include thyristor device 132 connected in series with heating element 122 and thyristor device 133 connected in series with heating element 123. Similarly, the heater circuits for thermal zone 114 respectively include thyristor devices 134, 135 and heating elements 124, 125, and the heater circuits for thermal zone 116 respectively include thyristor devices 136, 137 and heating elements 126, 127. Although two heating elements are provided for each thermal zone of furnace 110, it will be understood that the sum of their heating capability may be the same as the heating capability of the single heating element in each thermal zone in a comparable furnace of the type shown in FIG. 1. Each of thyristor devices 132-137 may be similar to any of the thyristor devices shown in FIG. 1 and described above. As in FIG. 1, each of thyristor devices 132-137 includes a trigger circuit for controlling the firing angle of an associated thyristor.

Three phase power is supplied to the system of FIG. 3 by power supply lines 142, 144, 146. The heater circuits associated with each thermal zone are connected in parallel in circuit relation with a respective one of the phases of the power supply. In the particular embodiment shown in FIG. 3, the heater circuits are in delta connection with the power supply. Thus the heater circuits associated with each thermal zone are connected in parallel between a respective one of the three possible pairs of the three power supply lines. The heater circuits for thermal zone 112 are connected in parallel between power supply lines 142 and 144; the heater circuits for thermal zone 114 are connected in parallel between power supply lines 144 and 146; and the heater circuits for thermal zone 116 are connected in parallel between power supply lines 142 and 146.

Each thermal zone in furnace 110 includes a thermocouple, respectively designated 152, 154, 156, similar to the thermocouples in the system of FIG. 1. The output signals of thermocouples 152, 154, 156 are respectively applied to one input terminal of controller circuits 162, 164, 166, similar to the controller circuits in the system of FIG. 1. The system also includes temperature selector 170, similar to temperature selector 70 in the system of FIG. 1. The output signal of temperature selector 170 is applied to the remaining input terminal of each of controller circuits 162, 164, 166.

Each of controller circuits 162, 164, 166 compares the signals applied to it from the associated thermocouple and from temperature selector 170 and produces an output signal proportional to the power required by the associated thermal zone. The output signal of each controller circuit is respectively applied to the trigger circuits of the thyristor devices for the associated thermal zone. Thus the output signal of controller circuit 162 is applied to the trigger circuits of thyristor devices 132, 133 by way of lead 172; the output signal of controller circuit 164 is applied to the trigger circuits of thyristor devices 134, 135 by way of lead 174; and the output signal of controller circuit 166 is applied to the trigger circuits of thyristor devices 136, 137 by way of lead 176.

The trigger circuits of the thyristor devices associated with each thermal zone are adjusted so that the thyristor devices associated with each zone respond to the applied controller circuit output signal in substantially mutually exclusive but collectively exhaustive portions of the range of the controller circuit output signal. For example, if the output signal of controller circuit 162 varies linearly with the power required by thermal zone 112 from 0mA when zero power is required by thermal zone 112 to 5mA when maximum power is required by thermal zone 112 and assuming that the two heating elements in thermal zone 112 are of equal heating capability, the trigger circuit for thyristor 132 is adjusted to respond to a controller circuit output signal in the range from 0 to 2.5mA and the trigger circuit for thyristor 133 is adjusted to respond to a controller circuit output signal in the range from 2.5 to 5mA. When the output signal of controller circuit 162 is in the range from 0 to 2.5MA, thyristor device 132 supplies power proportional to that signal to heating element 122 and thyristor device 133 is cut off. When the output signal of controller circuit 162 is in the range from 2.5 to 5mA, thyristor device 132 is fully conducting and thryistor device 133 supplies power proportional to the control signal current in excess of 2.5mA. When the output signal of controller circuit 162 is 0mA, thyristor devices 132 and 133 are both cut off; when the output signal of controller circuit 162 is 2.5mA, thyristor device 132 is fully conducting and thyristor device 133 is still substantially cut off; and when the output signal of controller circuit 162 is 5mA, thyristor devices 132 and 133 are both fully conducting. Accordingly, when the power requirement for thermal zone 112 is in the range from 0 to 50% of maximum power for thermal zone 112 (and the output signal of controller circuit 162 is therefore in the range from 0 to 2.5mA in the foregoing example), thyristor device 132 supplies the required amount of power to heating element 122 and thyristor device 133 is completely cut off. When the power requirement for thermal zone 112 is in the range from 50 to 100% of maximum power for thermal zone 112 (and the output signal of controller 162 is therefore in the range from 2.5 to 5mA in the foregoing example), thyristor device 132 is fully conducting, thereby supplying 50% of maximum power for thermal zone 112 to heating element 122. In addition, thyristor device 133 supplies the remainder of the power requirement of thermal zone 112 to heating element 123.

The heater circuits associated with thermal zones 114 and 116 operate in the same manner in response to the output signals of controller circuits 164 and 166, respectively. In each case, a first heater circuit (assumed for convenience to be the circuit having the lower numbered elements) operates when the power requirement for the associated thermal zone is in the range from 0 to 50% of maximum power for that zone. When the power requirement for each zone is greater than 50% of maximum power (i.e., in the range from 50 to 100%), the thyristor in the first heater circuit is fully conducting and the thyristor in the second heater circuit supplies the remainder of the power required by the thermal zone. Accordingly, the second heater circuit for each thermal zone does not begin to operate until the power required by that thermal zone is greater than 50% of maximum power for that zone; and as long as the second heater circuit is operating, the first heater circuit is fully conducting. As a consequence, only one of the thyristors associated with each thermal zone is operating to produce a substantial shift in the phase of the power supplied to the heating elements in that thermal zone at any time. While the thyristor in the first heater circuit for any given thermal zone is causing a phase shift in the power in that circuit (i.e., while the power requirement of the thermal zone is less than 50% of maximum power), the second heater circuit for that zone is cut off. Similarly, while the thyristor in the second heater circuit is causing a phase shift in the power in that circuit (i.e., while the power requirement of the thermal zone is greater than 50% of maximum power), the thyristor in the first heater circuit for that zone is fully conducting, causing little or no phase shift in the power in that circuit. At most, only a portion of the total power which can be supplied to the heating elements in any thermal zone is subject to a substantial phase shift at any time. Accordingly, the phase shift effects in furnaces constructed in accordance with the principles of this invention are substantially less than those in furnaces of the type shown in FIG. 1.

Although only two heater circuits are provided for each thermal zone in the embodiment shown in FIG. 3, it will be understood that more than two such circuits can be provided if desired. All of the heater circuits for each thermal zone are connected in parallel in circuit relation with a respective one of the phases of the power supply. The operating power range of each thermal zone is divided into as many portions or subranges as there are heater circuits for that zone, and each heater circuit is associated with a respective one of said subranges. When a thermal zone is to be operated in a selected one of the power subranges, the thyristor devices in all of the heater circuits associated with subranges lower than the selected subrange are rendered fully conducting, the thyristor devices in heater circuits associated with subranges higher than the selected subrange are rendered nonconducting, and the thyristor device in the heater circuit associated with the selected subrange is operated to supply the additional or marginal amount of power (in addition to the power supplied by the fully conducting thyristors) to operate the thermal zone at the desired point in the selected subrange. If the heating capabilities of all of the heating elements in a given thermal zone are substantially equal, as is generally preferable, the operating power range of that thermal zone is divided into substantially equal subranges. If the heating capabilities of the heating elements in a given thermal zone are unequal, the operating power range of that thermal zone can be divided into subranges which correspond to the heating capabilities of the associated heating elements. For example, if a thermal zone has two heating elements having respectively 40% and 60% of the total heating capability for that thermal zone, the operating power range for that zone can be divided into two subranges of 40% and 60% of maximum power for that zone and those subranges are respectively associated with the two heating elements.

Figure 4:
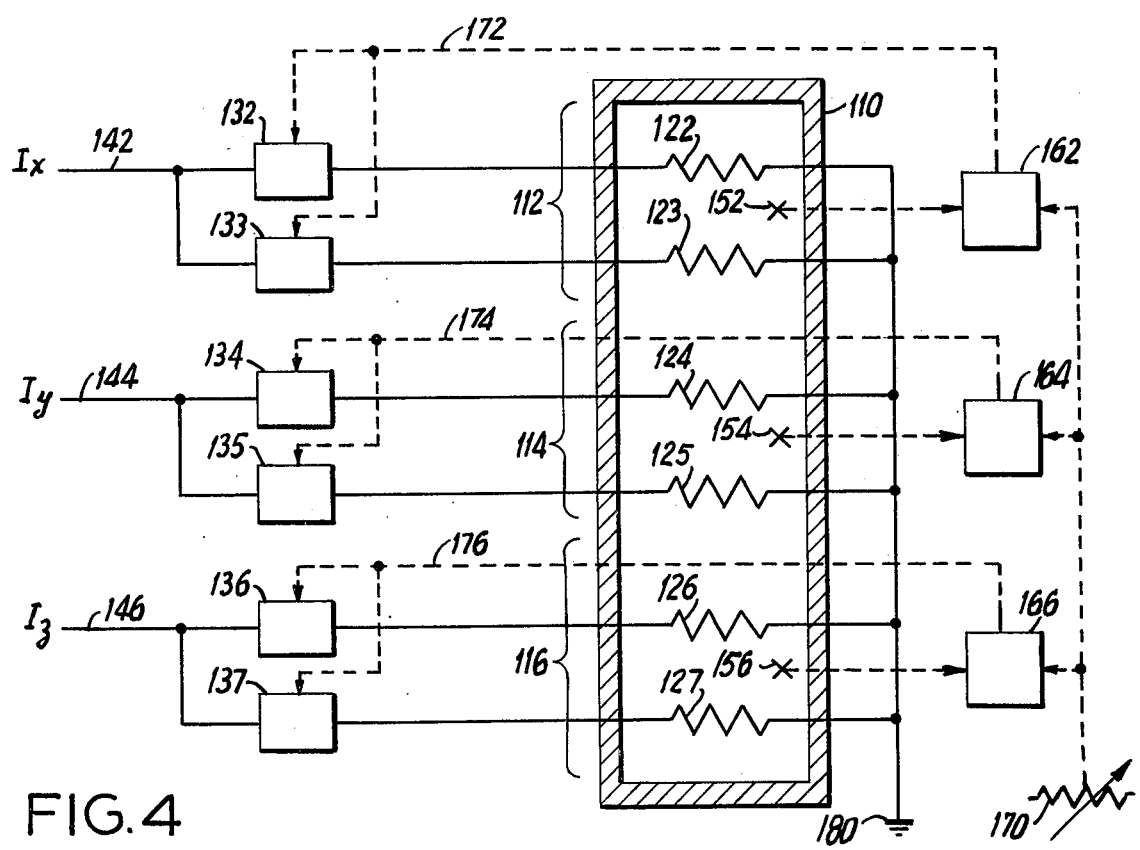
FIG. 4 is a schematic block diagram of a furnace system similar to the system of FIG. 3 but arranged in Y connection with the power supply.

FIG. 4 shows how a furnace system similar to the system shown in FIG. 3 can alternatively be arranged in Y connection with the power supply lines. As shown in FIG. 4, the two heater circuits for each thermal zone are connected in parallel between a respective one of the three power supply lines and a common ground 180. The heater circuits for thermal zone 112 are connected in parallel between power supply line 142 and ground 180; the heater circuits for thermal zone 114 are connected in parallel between power supply 144 and ground 180; and the heater circuits for thermal zone 116 are connected in parallel between power supply line 146 and ground 180. In other respects, the system of FIG. 4 is similar to the system of FIG. 3, and the heater circuits are operated in the same way that the corresponding heater circuits in the system of FIG. 3 are operated.

Although three phase power is employed in the illustrative embodiments discussed above, it will be understood that furnaces can be constructed in accordance with the principles of this invention which employ polyphase power having any number of phases. As in the case of three phase power, the heater circuits for each thermal zone are connected in circuit relation with a respective one of the phases of the power supply, i.e., either between a respective one of the possible pairs of power supply lines (delta connection) or between a respective one of the power supply lines and ground (similar to Y connection). If the number of thermal zones is greater than the number of power supply lines, the heater circuits for two or more thermal zones can be connected in circuit relation with each power supply phase. In other respects the furnace systems are similar to those described above and are within the scope of this invention.

Any of the furnace systems shown and described above can include conventional current limiting apparatus associated with each heater circuit for preventing the current flowing in the heater circuit from exceeding a predetermined allowable maximum current (usually the allowable maximum current for the thyristor devices). Such current limiting apparatus is frequently required in systems having heating elements of molybdenum or the like which has very low resistivity at low temperatures but which increases substantially in resistivity as temperature increases. Unless the current supplied to a molybdenum heating element is limited while that element is at relatively low temperatures, the heating element may draw more current than the associated thyristor can safely supply, with consequent damage to the thyristor. In order to prevent this, current limiting apparatus, which may be conventional, can be associated with each heater circuit as mentioned above. This apparatus may operate for the most part during the relatively short intervals when the furnace is being started up, i.e., while the heating elements are at relatively low temperatures.

Figure 5:
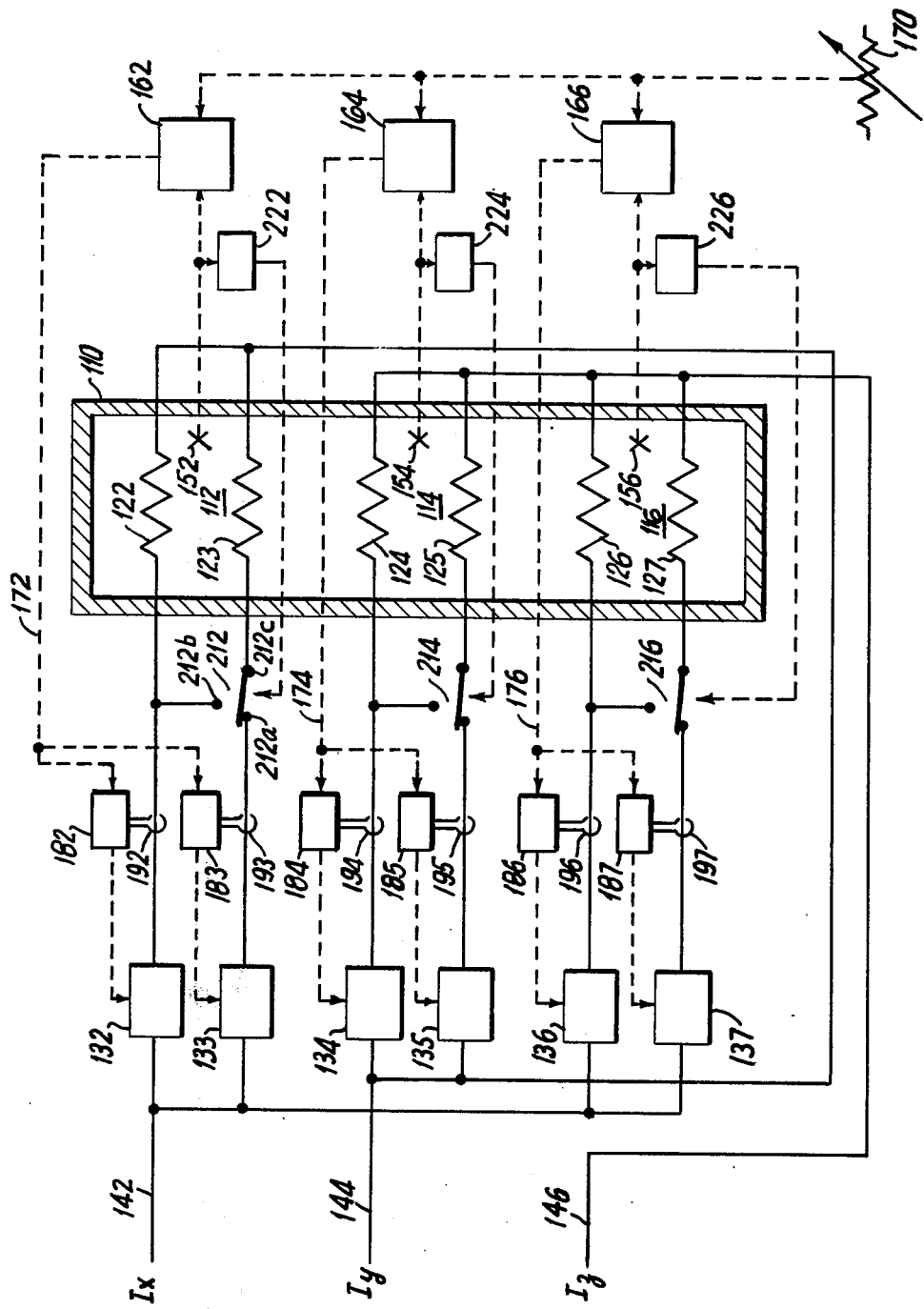
FIG. 5 is a schematic block diagram of a furnace system similar to the system of FIG. 3 including means for preventing the over-powering of the heating elements at higher temperatures.

FIG. 5 shows a furnace system similar to the system of FIG. 3 including current limiting apparatus as mentioned above. FIG. 5 also shows how the furnace system of FIG. 3 can be modified in accordance with the principles of this invention to improve the match between the power supplied to the furnace heating elements and the power dissipating properties of those elements at various temperatures to prevent over-powering of the heating elements at higher temperatures.

Considering first the current limiting apparatus in the system of FIG. 5, trigger circuits for each of thyristors 132–137 are shown separately in that Figure and designated 182–187, respectively. Connected to each trigger circuit is a current sensor, respectively designated 192–197, for producing an output signal proportional to the current flowing in the associated heater circuit. Each of current sensors 192–197 may be a current transformer coil or loop disposed around the power line connecting the thyristor and the heating element in the associated heater circuit. The output signal of each current sensor biases the trigger circuit to which it is applied to prevent the current flowing in the associated heater circuit from exceeding a predetermined allowable maximum current, even if the output signal of the associated controller circuit 162, 164, or 166 calls for more power. In other words, the output signal of the current sensor renders the trigger circuit unresponsive to the applied controller circuit output signal to the extent that the controller circuit output signal calls for current in excess of the allowable maximum current for the heater circuit. In furnaces having heating elements of molybdenum or the like, this may occur, for example, during warm-up of the furnace while the heating elements are at relatively low temperatures and their resistance is therefore also low. At some temperature, however, the resistance of the heating elements will have increased to a point at which the currents in the heater circuits are limited to a value less than the allowable maximum current by the voltage of the power supply. Thereafter, the current limiters are no longer generally required to limit the currents in the heater circuits.

Turning now to the apparatus shown in FIG. 5 for preventing the over-powering of the heating elements at higher temperatures, a switching device 212, 214, or 126 is associated with each thermal zone for selectively interconnecting the heater circuits for that zone. Switching devices 212, 214, and 216 are respectively controlled by the output signals of temperature threshold detectors 222, 224, and 226, which are in turn respectively responsive to the output signals of thermocouples 152, 154, and 156. Although three separate threshold detectors are employed in the system of FIG. 5, it will be understood that two or more of switching devices 212, 214, 216 can be controlled by one threshold detector if desired.

At temperatures below a predetermined threshold temperature established by threshold detectors 222, 224, 226, switching devices 212, 214, 216 are positioned as shown in FIG. 5 to connect the thyristor in the second heater circuit for each thermal zone to the heating element in that heater circuit. Accordingly, the two heater circuits for each thermal zone are entirely separate and operate as described above in connection with FIG. 3, with the addition of the current limiting apparatus discussed above. When the temperature indicated by any of thermocouples 152, 154, or 156 exceeds the predetermined threshold temperature, the associated threshold detector switches the corresponding switching device, thereby disconnecting the heating element in the second heater circuit for the associated thermal zone from the thyristor device in that circuit and connecting that heating element to the thyristor device in the first heater circuit for that thermal zone. For example, when the temperature indicated by thermocouple 152 exceeds the threshold temperature established by threshold detector 222, threshold detector 222 produces an output signal which switches switching device 212 from the position shown in FIG. 5 to its other position (connecting terminals 212b and 212c rather than terminals 212a and 212c as shown in FIG. 5). In that position heating element 123 is disconnected from thyristor 133 and connected instead to thyristor 132. Thyristor 132 now supplies power to both of the heating elements for thermal zone 112 and thyristor 133 is effectively removed from the system. Accordingly, the power supplied by thyristor 132 is divided between heating elements 122 and 123 and over-powering of those heating elements is substantially prevented.

After the switching of switching device 212 as described above, thyristor 132 may be at least temporarily current limited by operation of the associated current limiting apparatus including elements 182 and 192. This will further insure that heating elements 122 and 123 are not over-powered.

If more than two heater circuits are provided for each thermal zone in a system of the type shown in FIG. 5, the heating elements in those circuits can be redistributed among the thyristor devices in those circuits at various threshold temperatures as required to protect the heating elements from being over-powered at higher temperatures. For example, if four heater circuits are provided for a thermal zone, they may be interconnected in pairs of two when a first threshold temperature is reached so that the four heating elements are then powered by two of the thyristor devices.

When a second, higher threshold temperature is reached, the paired heater circuits may be interconnected again so that all four heating elements are then powered by a single thyristor device.

It is to be understood that the embodiments shown and described herein are illustrative of the principles of this invention only and that modifications can be implemented by those skilled in the art without departing from the scope and spirit of the invention. For example, more than two heater circuits can be provided for each thermal zone as discussed in detail above.

What is claimed is:

1. In an electrical furnace including a plurality of thermal zones, said furnace being supplied with polyphase electrical power, the improvement comprising:
    a plurality of heater circuits associated with each thermal zone, each of said heater circuits including a heating element and a thyristor device for controlling the amount of power supplied to said heating element;
    means for connecting the heater circuits associated with each thermal zone in parallel in circuit relation with a respective one of the phases of the polyphase power; and
    means for controlling the thyristor devices in the heater circuits associated with each thermal zone so that only one of said thyristor devices is operating to produce a substantial phase shift in the power supplied to the associated heating element at any time.

2. The apparatus defined in claim 1 wherein said means for controlling the thyristor devices in the heater circuits associated with each thermal zone comprises:
    means for producing an output signal proportional to the power required by said thermal zone;
    first trigger circuit means responsive to said output signal for controlling a first of said thyristor devices associated with said thermal zone to supply the power required by said thermal zone when the power requirement is in a first relatively low portion of the operating power range of said thermal zone and to render said first thyristor device substantially fully conducting when said power requirement is greater than the upper limit of said first portion of said operating power range; and
    second trigger circuit means responsive to said output signal for controlling a second of said thyristor devices associated with said thermal zone to render said second thyristor device substantially nonconducting when the power requirement of said thermal zone is in said first portion of said operating power range and to supply the power required in addition to that supplied by said first thyristor device associated with said thermal zone when said power requirement is in a second portion of said operating power range above said first portion.

3. The apparatus defined in claim 2 wherein said means for producing an output signal comprises:
    means for monitoring the temperature in said thermal zone and for producing a first signal proportional to the temperature in said thermal zone;
    means for producing a second signal proportional to a desired temperature in said thermal zone; and
    means for comparing said first and second signals.

4. The apparatus defined in claim 1 further comprising:
    switching means associated with at least one thermal zone for selectively connecting the heating element in a second of the heater circuits associated with said thermal zone to either the thyristor device in said second heater circuit or the thryistor device in a first of the heater circuits associated with said thermal zone; and
    temperature threshold detector means associated with said thermal zone for controlling the switching means associated with said thermal zone to connect the heating element in said second heater circuit to the thyristor device in said first heater circuit when the temperature in said thermal zone exceeds a predetermined threshold temperture.

5. The apparatus defined in claim 1 wherein said means for connecting comprises circuit means for connecting the heater circuits associated with each thermal zone in parallel between a respective one of the possible pairs of power lines respectively supplying the phases of the polyphase power.

6. The apparatus defined in claim 1 wherein said means for connecting comprises circuit means for connecting the heater circuits associated with each thermal zone in parallel between a respective one of the power lines respectively supplying the phases of the polyphase power and ground.

7. The method of operating an electrical furnace including a plurality of thermal zones and supplied with polyphase electrical power, said furnace further including a plurality of heater circuits associated with each thermal zone, each heater circuit including a heating element and a thyristor device for controlling the amount of power supplied to said heating element, the heater circuits associated with each thermal zone being connected in parallel in circuit relation with a respective one of the phases of the polyphase power, said method comprising the steps of:
    controlling a first of the thyristor devices associated with each thermal zone to supply the power required by said thermal zone when the power requirement is in a first relatively low portion of the operating power range of said thermal zone;
    rendering said first thyristor device associated with each thermal zone substantially fully conducting when the power required by said thermal zone exceeds the upper limit of said first portion of said operating power range of said thermal zone; and
    controlling a second of the thyristor devices associated with each thermal zone to supply the power required in addition to the power supplied by said first thyristor device associated with said thermal zone when the power requirement of said thermal zone is in a second portion of said operating power range above said first portion, said second thyristor device being substantially nonconducting when the power requirement is in said first portion of said operating power range.

8. The method defined in claim 7 further comprising the steps of:
    disconnecting the second thyristor device associated with at least one thermal zone from the associated heating element when the temperature in said thermal zone exceeds a predetermined threshold level; and
    connecting the disconnected heating element to the first thyristor device associated with said thermal zone in parallel with the heating element already connected to said first thyristor device.

* * * * *

UNITED STATES PATENT AND TRADEMARK OFFICE
CERTIFICATE OF CORRECTION

PATENT NO. : 4,011,430
DATED : March 8, 1977
INVENTOR(S) : Donald Eli Witkin; Andrew Stephenson Dalgleish Crum It is certified that error appears in the above-identified patent and that said Letters Patent are hereby corrected as shown below:

Abstract, line 10: "connected" should be --connecting--.

Column 3, line 45: after "nected" insert --between--.

Column 5, line 33: "in" should be --In--.

Column 6, line 68: "2.5MA" should be --2.5mA--.

Column 10, line 7: "126" should be --216--.

Signed and Sealed this

Tenth Day of May 1977

[SEAL]

Attest:

RUTH C. MASON
Attesting Officer

C. MARSHALL DANN
Commissioner of Patents and Trademarks